(12) United States Patent  (10) Patent No.: US 8,292,545 B2
Tjader  (45) Date of Patent: Oct. 23, 2012

(54) SMALL DIAMETER SPLITTER AND METHOD

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 302 days.

(21) Appl. No.: 12/491,682

(22) Filed: Jun. 25, 2009

(65) Prior Publication Data

US 2010/0329793 A1  Dec. 30, 2010

(51) Int. Cl.
*F16L 55/44* (2006.01)
*B26D 3/16* (2006.01)

(52) U.S. Cl. .................. 405/184.3; 30/92.5; 83/879

(58) Field of Classification Search ............... 405/184.1, 405/184.3; 30/92, 92.5; 83/870, 879, 178
See application file for complete search history.

(56) References Cited

U.S. PATENT DOCUMENTS

| 5,076,731 | A | * | 12/1991 | Luksch | 405/184.3 |
| 5,078,546 | A | * | 1/1992 | Fisk et al. | 405/156 |
| 5,173,009 | A | * | 12/1992 | Moriarty | 405/184.3 |
| 5,302,053 | A | * | 4/1994 | Moriarty | 405/184.3 |
| 6,092,553 | A | * | 7/2000 | Hodgson | 138/97 |
| 6,382,877 | B1 | * | 5/2002 | Hodgson | 405/184.3 |
| 7,384,214 | B2 | * | 6/2008 | Tjader | 405/184.3 |
| 2004/0218982 | A1 | * | 11/2004 | Wentworth et al. | 405/184.3 |
| 2005/0138815 | A1 | * | 6/2005 | Schmidt | 30/92.5 |

* cited by examiner

*Primary Examiner* — Tara Mayo-Pinnock
(74) *Attorney, Agent, or Firm* — Schwegman Lundberg & Woessner, P.A.

(57) ABSTRACT

A pipe splitter is shown including a splitter body having a central opening configured to accept a pulling or pushing member. An expander has an entry profile smaller than an inner diameter of a pipe to be split and an expanded profile that is larger than the inner diameter of the pipe to be split. A protrusion is disposed on the expander. The protrusion is configured to concentrate splitting stress at a location on the pipe. The concentrated splitting stress is greater than a threshold stress of the pipe to burst the pipe. In some examples, a method of pipe splitting is described.

13 Claims, 4 Drawing Sheets

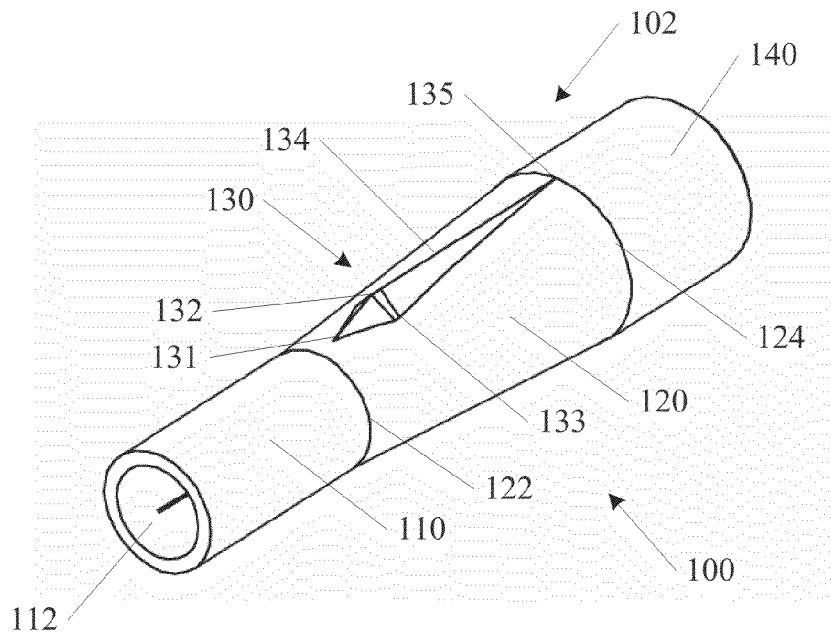
FIG. 1
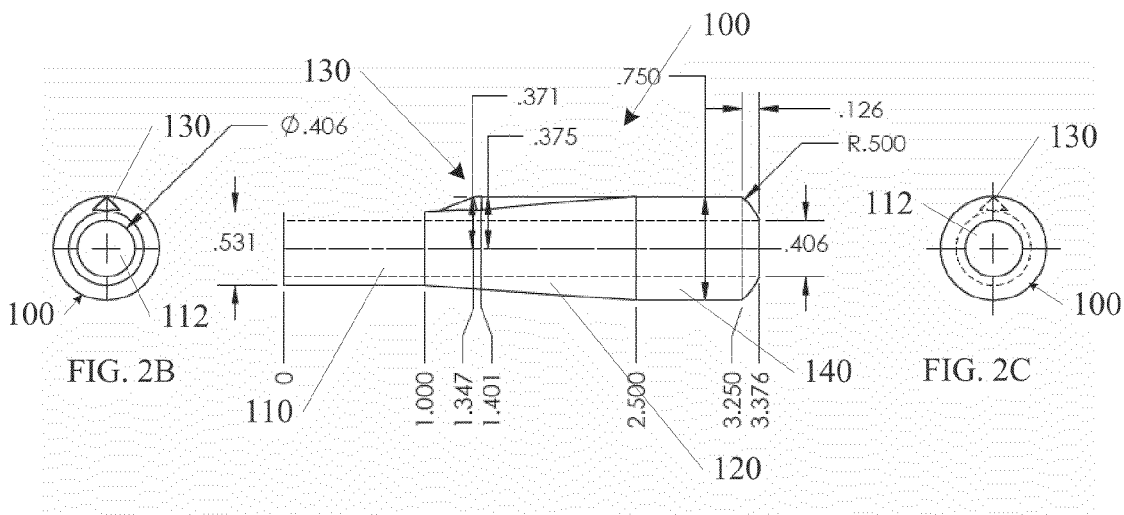
FIG. 2B
FIG. 2C
FIG. 2A

SMALL DIAMETER SPLITTER AND METHOD

BACKGROUND

Pipe materials such as cast iron, steel, ductile iron, copper, polymeric materials, etc. have been used for connecting homes and creating networks for utilities such as water, sewer, or gas, etc. For any number of reasons, an existing pipe may crack or break, necessitating replacement of the pipe.

Pipe splitting is useful for replacement of pipes without the need to excavate the length of the pipe to be replaced. An example of pipe splitting includes pulling a device including a cutting blade or wheel through the pipe to be replaced and attaching a new pipe behind the cutting blade or wheel. The pipe to be replaced is split by the device with the cutting blade or wheel and is pushed into the surrounding soil. The new pipe, of equal or larger diameter, is pulled into the new space within the split pipe.

BRIEF DESCRIPTION OF THE DRAWINGS

FIG. 1 shows an isometric view of a pipe splitter according to an embodiment of the invention.

FIG. 2A shows a side view of a pipe splitter according to an embodiment of the invention.

FIG. 2B shows a front view of the pipe splitter from FIG. 2A according to an embodiment of the invention.

FIG. 2C shows a rear view of the pipe splitter from FIG. 2A according to an embodiment of the invention.

DETAILED DESCRIPTION

Figure 3:
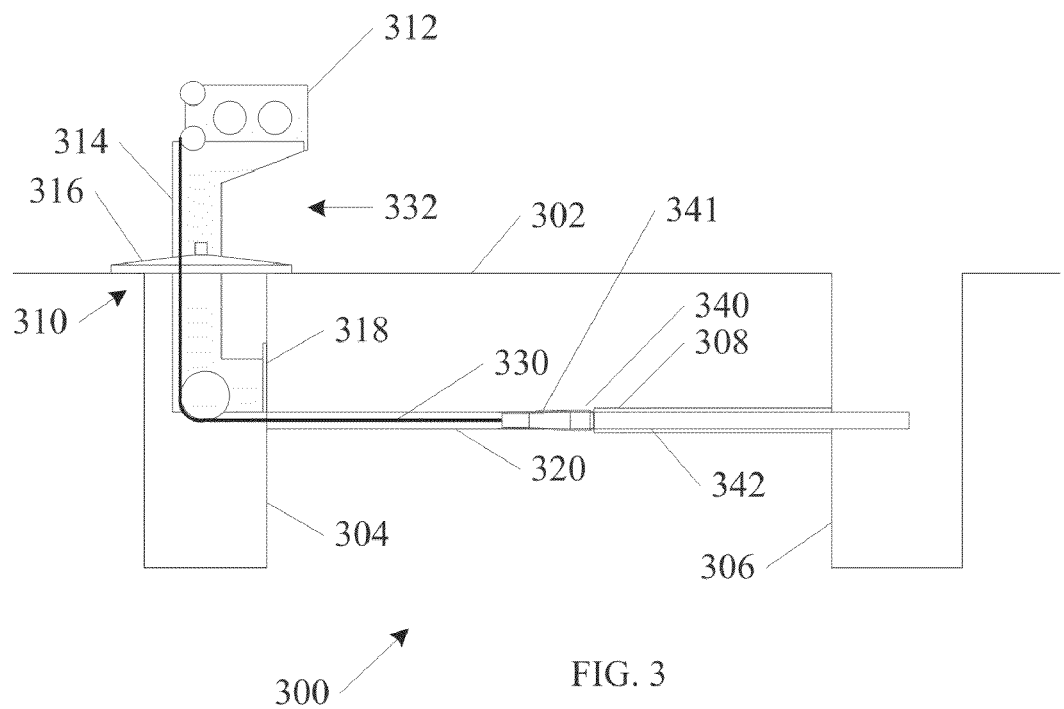
FIG. 3 shows a pipe splitter in operation according to an embodiment of the invention.

The following detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, examples are also contemplated in which only those elements shown and described are provided. In the drawings, like numerals describe substantially similar components throughout the several views.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In the following description, the term cable is defined to include metal cables, wire rope, or other lengths of flexible line of suitable strength to pull devices as described below through a section of pipe. These embodiments are described in sufficient detail to enable those skilled in the art to practice the invention. Other embodiments may be utilized and structural, or logical changes, etc. may be made without departing from the scope of the present invention.

Referring to FIGS. 1 and 2A-2C, an example pipe splitter 100 is shown. In an example, the pipe splitter 100 can be used to expand and burst pipes, in particular, underground pipes. Such pipes can be made from various materials, including steel, iron, cast iron, ceramic, polymeric material (such as PVC, for instance), copper, lead, or the like. The pipe splitter 100, in various examples, includes a splitter body 102 having a central opening 112 configured to accept a pulling or pushing member. In an example, the central opening 112 is configured to accept a cable pulling member. In another example, the central opening 112 is configured to accept a segmented rod pulling or pushing member. Various attachment methods are contemplated herein for attaching the pulling or pushing member to the pipe splitter 100. For instance, such attachment methods include the use of grips, a threaded connection, hooks, latches, a tab-in-slot connection, abutting connection, friction fit, or the like.

In an example, the pipe splitter 100 includes an entry portion 110 at a leading end of the pipe splitter 100. In an example, the entry portion 110 can be cylindrical in shape and can be sized to fit within a pipe to be split. In some examples, the entry portion 110 can help stabilize and guide the pipe splitter 100 within the pipe to be split by abutting an interior of the pipe to be split, thereby aiding in resisting of twisting motion imparted during pipe splitting. To that end, the entry portion 110 can be of any length appropriate to help stabilize and guide the pipe splitter 100. In other examples, the pipe splitter 100 does not include an elongated entry portion 110.

In an example, the pipe splitter 100 includes an expander 120 having an entry profile 122 smaller than an inner diameter of the pipe to be split and an expanded profile 124 that is larger than the inner diameter of the pipe to be split. In some examples, the expander 120 can be substantially conical. In other examples, the expander 120 can be substantially pyramidal. In still other examples, the expander 120 can be rounded between the entry profile 122 and the expanded profile 124. In further examples, the expander 120 can be asymmetric.

In an example, the pipe splitter 100 includes a protrusion 130 disposed on the expander 120. In some examples, the protrusion 130 is configured to concentrate splitting stress at a location on the pipe, such that the concentrated splitting stress is greater than a threshold stress of the pipe in order to burst the pipe. As such, in some examples, the protrusion 130 can be substantially diamond shaped with a leading point 131, expanding to a widened portion 133, and then tapering back to a trailing point 135. The protrusion 130, in some examples, can extend generally radially outwardly from the expander 120 of the pipe splitter 100. In an example, the protrusion 130 extends outwardly from the expander 120 and comes to a point 132 positioned to contact an interior surface of the pipe to concentrate splitting stress at a location on the pipe. In an example, the protrusion 130 includes a trailing portion 134 tapering back from the point 132 to the expanded profile portion 124 of the expander 120. In a further example, the trailing portion 134 tapers back from the point 132 to the trailing point 135. In the examples shown, the trailing point 135 is located on the pipe splitter 100 at the expanded profile portion 124 of the expander 120.

In an example, the pipe splitter 100 includes a trailing portion 140. In some examples, the trailing portion 140 includes a substantially cylindrical shape having a width similar to that of the expanded profile portion 124 of the expander 120. The trailing portion 140 of the pipe splitter 100, in other examples, can include other shapes or can be eliminated entirely.

Referring now to FIG. 3, an example of a system 300 for pipe splitting is shown. In an example, the system 300 includes a pipe splitter 340 to split an existing pipe 320 and replace the existing pipe with a replacement pipe 342. In an example, the existing pipe 320 is accessed using an entry pit 306 and an exit pit 304. The system 300 includes a pulling assembly 310, for instance, including a puller 312 and a support stand 314, for use at the exit pit 304 to pull the pipe splitter 340 through the existing pipe 320. In an example, the puller 312 pulls a cable 330 or other such pulling member. In this example, the puller 312 can be maintained above the exit pit 304 with only a portion of the support stand 314 disposed within the exit pit 304, thereby allowing for a relatively small exit pit 304. In an example, the support stand 314 includes a first support surface 316 to support the support stand 314 on a substantially horizontal surface such as a top surface of the ground 302 and a second support surface 318 to support the support stand 314 on a substantially vertical surface such as a wall of the exit pit 304.

The cable 330, in an example, is attached to the pipe splitter 340 to pull the pipe splitter 340 in a direction 332 and force the pipe splitter 340 through the existing pipe 320. In an example, a protrusion 341 of the pipe splitter 340 can be similar to the protrusion 130 described above and is configured to concentrate splitting stress at a location on the pipe 320, such that the concentrated splitting stress is greater than a threshold stress of the pipe 320 in order to burst the pipe 320. Once the pipe 320 is burst or otherwise split, in an example, the pipe splitter 340 expands the split pipe 320, forcing it into the surrounding ground 302 to form an expanded tunnel 308, through which the replacement pipe 342 can be pulled.

In various examples, the replacement pipe 342 can be attached to the trailing end of the pipe splitter 300 in various manners, including, but not limited to, threadably connecting an interior surface of the replacement pipe 342 with the pipe splitter 300; screwing, bolting, or otherwise fastening the replacement pipe 342 to the pipe splitter 300; use of gripping members such as jaws, teeth, wedges, collets, or the like; use of expander cones; etc. In this way, the replacement pipe 342 can be pulled through the expanded tunnel 308 to replace the existing pipe 320. In one example, the replacement pipe 342 can be fed into the expanded tunnel 308 through the entry pit 306.

Figure 4:
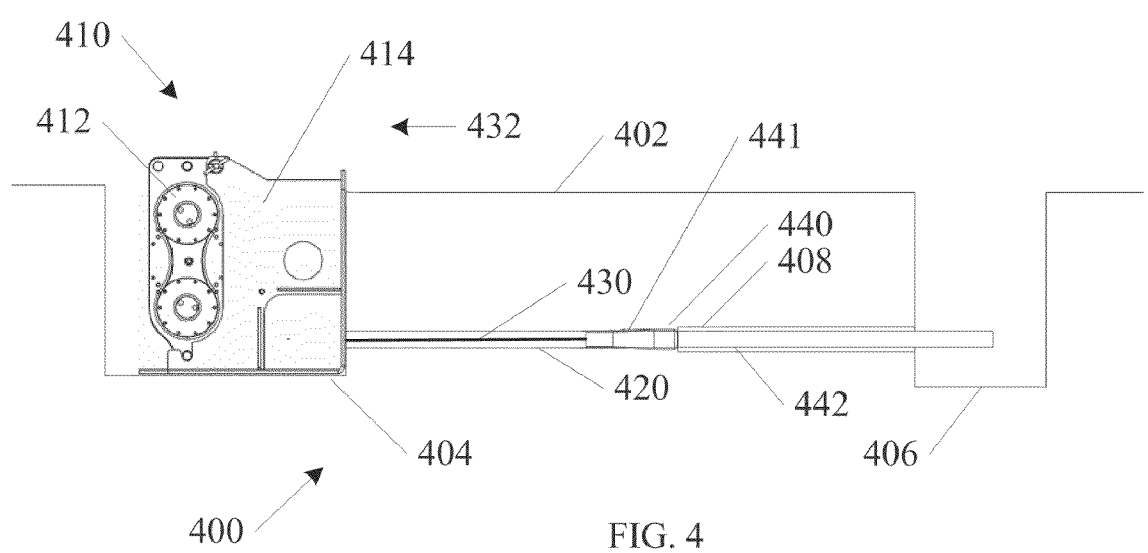
FIG. 4 shows another arrangement of a pipe splitter in operation according to an embodiment of the invention.

Referring now to FIG. 4, another example of a system 400 for pipe splitting is shown. In an example, the system 400 includes a pipe splitter 440 to split an existing pipe 420 and replace the existing pipe with a replacement pipe 442. In an example, the existing pipe 420 is accessed using an entry pit 406 and an exit pit 404. The system 400 includes a pulling assembly 410, for instance, including a puller 412 and a support stand 414, for use at the exit pit 404 to pull the pipe splitter 440 through the existing pipe 420. In an example, the puller 412 pulls a cable 430 or other such pulling member. In this example, the puller 412 can be placed within the exit pit 404. In an example, the support stand 414 includes support surfaces to support the support stand 414 on a substantially horizontal surface, such as a bottom surface of the exit pit 404, and against a substantially vertical surface, such as a wall of the exit pit 404.

The cable 430, in an example, is attached to the pipe splitter 440 to pull the pipe splitter 440 in a direction 432 and force the pipe splitter 440 through the existing pipe 420. In an example, a protrusion 441 of the pipe splitter 440 can be similar to the protrusion 130 described above and is configured to concentrate splitting stress at a location on the pipe 420, such that the concentrated splitting stress is greater than a threshold stress of the pipe 420 in order to burst the pipe 420. Once the pipe 420 is burst or otherwise split, in an example, the pipe splitter 440 expands the split pipe 420, forcing it into the surrounding ground 402 to form an expanded tunnel 408, through which the replacement pipe 442 can be pulled.

In various examples, the replacement pipe 442 can be attached to the trailing end of the pipe splitter 400 in various manners similar to those described with respect to the embodiments above.

Figure 5:
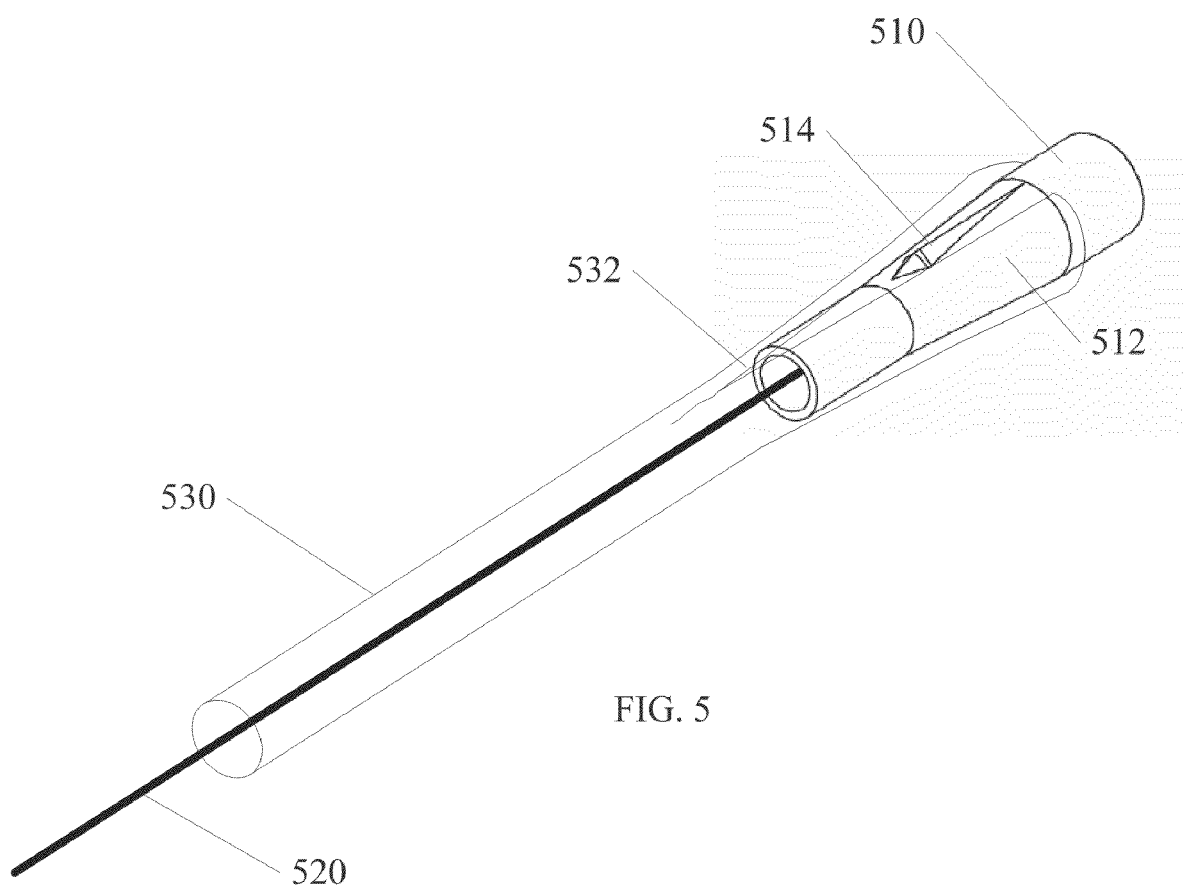
FIG. 5 shows an isometric view of a pipe splitter and pipe according to an embodiment of the invention.

Referring to FIG. 5, an example of a pipe splitter 510 splitting a pipe 530 is shown. In an example, the pipe splitter 510 includes an expander 512. In some examples, the pipe splitter 510 can include a protrusion 514 similar to the protrusion 130 described above. In an example, the pipe splitter 510 can be pulled through the pipe 530 to be split using a cable 520 or other such pulling member. As described above, in other examples, a pushing member such as a rod or the like can be used to push the pipe splitter 510 through the pipe 530 to be split. As above, in some examples, the expander 512 goes from a profile small enough to fit within the pipe 530 to a larger profile. The protrusion, in one example, can be diamond-shaped and positioned on the expander 512, extending from the expander 512, so that the expander 512 in conjunction with the protrusion 514 create a hoop stress in the pipe 530 with a stress concentration corresponding to the engagement of the protrusion 514 with an interior surface of the pipe 530. By expanding the pipe 530 outwardly as the expander 512 is passed through the pipe 530, the expander 512 can cause a hoop stress in the pipe 530 that exceeds a stress threshold of the pipe 530 to burst the pipe 530, with the protrusion 514 concentrating stress at a particular location along the pipe 530. As shown in FIG. 5, in an example, a split 532 can be generated in the pipe 530 in front of the protrusion 514 and not in direct contact with the protrusion 514. In some examples, the protrusion 514 can be configured so that the protrusion 514 does not extend above an exterior of the pipe 530.

Figure 6:
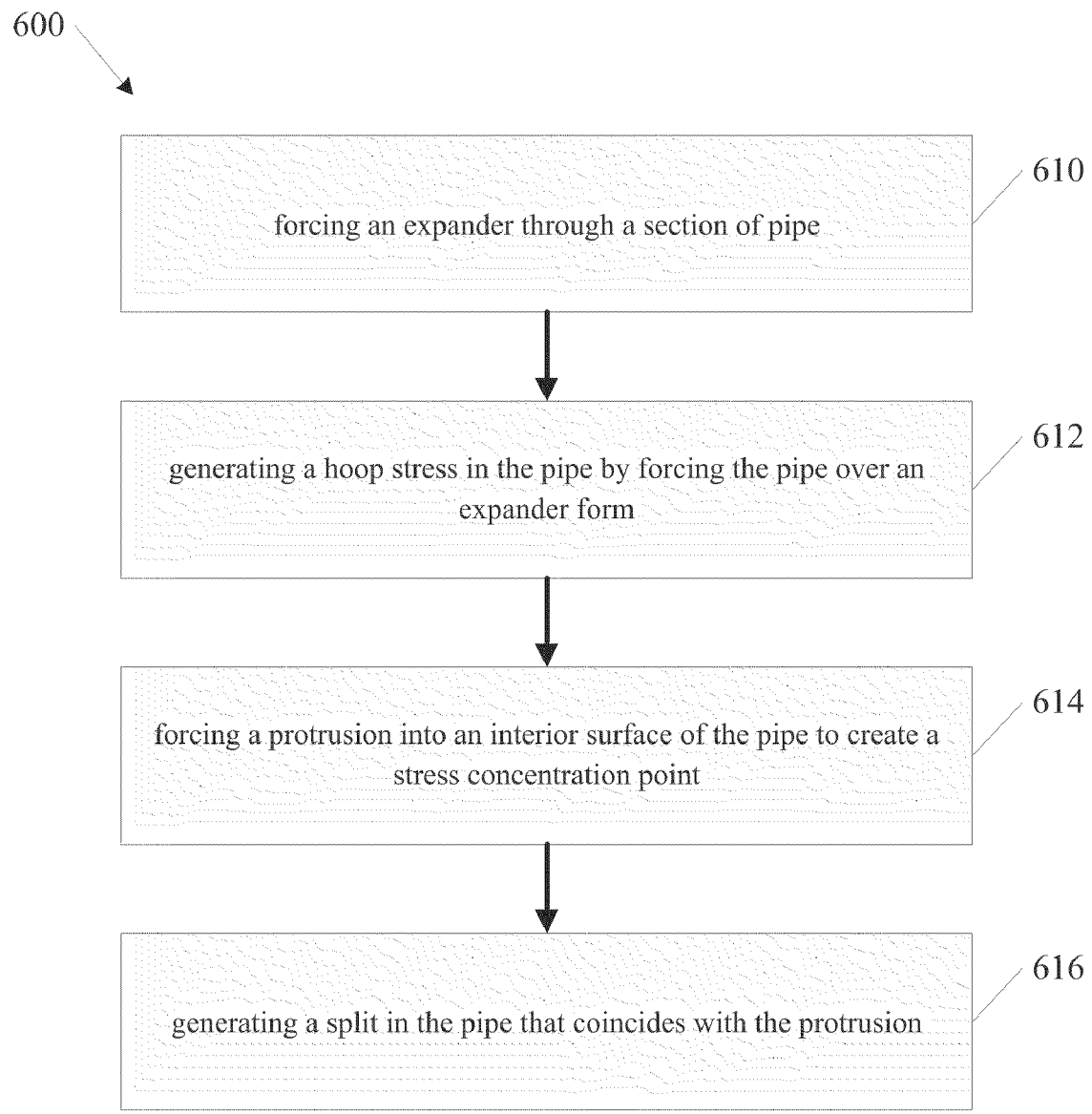
FIG. 6 shows an example method of splitting a pipe according to an embodiment of the invention.

Referring to FIG. 6, in an example, a method 600 of splitting a pipe includes, at 610, forcing an expander through a section of pipe. In one example, the expander is forced through a section of steel pipe. In other examples, the expander is forced through pipes made from materials other than steel. In some examples, the expander can be forced through a section of pipe by pulling the expander through the section of pipe. In other examples, the expander can be forced through a section of pipe by pushing the expander through the section of pipe. Pulling or pushing members, such as those described herein, for instance, can be used to pull or push the expander through the section of pipe. In an example, at 612, a hoop stress can be generated in the pipe by forcing the pipe over an expander form. At 614, in an example, a protrusion can be forced into an interior surface of the pipe to create a stress concentration point. At 616, in an example, a split can be generated in the pipe that coincides with the protrusion. In a further example, a split can be generated in the pipe in front of the protrusion and not in direct contact with the protrusion.

In another example, a method includes a method of replacing a steel pipe. In an example, an expander can be pulled through a section of steel pipe to generate a hoop stress in the steel pipe. A protrusion, in an example, can be forced into an interior surface of the steel pipe to create a stress concentration point. In a further example, a split can be generated in the steel pipe resulting from the stress concentration point. In some examples, a substantially diamond shaped protrusion can be forced into the interior surface of the steel pipe, wherein the protrusion comes to a point positioned to contact the interior surface of the pipe to create the stress concentration point. In still other examples, the protrusion can include a trailing portion that tapers back to an expanded profile portion of the expander. While such a protrusion functions well to split steel pipes, it is noted that pipes manufactured from other materials can also be split using the present example method. In some examples, the split can be formed in front of the protrusion and not in direct contact with the protrusion. In a further example, a replacement pipe can be concurrently pulled in behind the expander.

Examples of pipe splitters, such as those described above, are well-suited for splitting pipes, for instance, pipes disposed underground, without the need to excavate the ground from around the length of the pipe. In some examples, referring again to FIGS. 1 and 2A-2C, the expander 120 and the protrusion 130 are shaped or otherwise configured to create a stress concentration in a pipe to be split. Specifically, the stress concentration is formed at a point on the pipe corresponding to the point 132 of the protrusion 130. Rather than cutting the pipe, like a blade, a sharpened wheel, or some other sharpened device, the expander 120 and the protrusion 130 act to create and concentrate hoop stress to a level that surpasses a threshold stress of the pipe to burst the pipe. As noted above, such a configuration is particularly effective with steel pipe.

In further examples, referring now to FIG. 5, once the pipe 530 is burst, a split 532 is formed ahead of the expander 512 and protrusion 514 and is perpetuated by movement of the pipe splitter 510 through the pipe 530, such that, once the split 532 is started, the pipe splitter 510 essentially rips the pipe 530 as it is pushed or pulled through the pipe 530. In certain examples, the protrusion 514 is shaped to facilitate the continuation of the split 532. That is, in one example, the protrusion 514 is substantially diamond-shaped, flaring out to a widened portion (see the widened portion 133 in FIG. 1), which can act as a wedge to aid in maintaining the split 532 during movement of the pipe splitter 510 through the pipe 530. That is, the split 532, once formed, can be spread apart by the slanted surfaces between the point of the protrusion 514 and the widened portion of the protrusion 514 and can be kept apart by the widened portion of the protrusion 514 to allow the split 532 to propagate along the pipe 530 when the pipe splitter 510 is moved through the pipe 530.

While the above-described example pipe splitters can be used for splitting pipes made from various materials, the pipe splitter having the proportions shown in FIG. 2A can be particularly advantageous for splitting steel pipes. In other examples, the geometry of the pipe splitter can be changed to be better suited for splitting pipes made of different materials. In further examples, pipe splitters of different geometries can be used for pipes having different diameters, different wall thicknesses, or the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A pipe splitter, comprising:
    a splitter body having a central opening configured to accept a pulling or pushing member;
    an expander having an entry profile smaller than an inner diameter of a pipe to be split and an expanded profile that is larger than the inner diameter of the pipe to be split; and
    a protrusion disposed on the expander and extending radially outwardly from the expander no farther than the expanded profile, the protrusion configured to concentrate splitting stress at a location on the pipe, the concentrated splitting stress being greater than a threshold stress of the pipe to burst the pipe, the protrusion including a diamond shape including:
    a point positioned to contact the location of the pipe and configured to remain below an exterior wall of the pipe to be split; and
    a widened portion configured to spread a split of the pipe and propagate the split along the pipe.

2. The pipe splitter of claim 1, wherein the expander is substantially conical.

3. The pipe splitter of claim 1, wherein the central opening is configured to accept a cable pulling member.

4. The pipe splitter of claim 1, wherein the central opening is configured to accept a segmented rod pulling or pushing member.

5. The pipe splitter of claim 1, wherein the protrusion includes a trailing portion tapering back to the expanded profile portion of the expander.

6. A method of splitting a pipe, comprising:
    forcing an expander through a section of pipe, the expander including an entry profile smaller than an inner diameter of the pipe and an expanded profile that is larger than an inner diameter of the pipe;
    generating a hoop stress in the pipe by forcing the pipe over the expander;
    forcing a protrusion into an interior surface of the pipe to create a stress concentration point, the protrusion disposed on the expander and extending radially outwardly from the expander no farther than the expanded profile; and
    generating a split in the pipe that coincides with the protrusion, the protrusion including a diamond shape including:
    a point positioned to contact the pipe and configured to remain below an exterior wall of the pipe to be split; and
    a widened portion configured to spread the split of the pipe and propagate the split along the pipe.

7. The method of splitting a pipe of claim 6, wherein forcing the expander through a section of pipe includes forcing the expander through a section of steel pipe.

8. The method of splitting a pipe of claim 6, wherein generating the split in the pipe that coincides with the protrusion includes generating a split in the pipe in front of the protrusion and not in direct contact with the protrusion.

9. The method of splitting a pipe of claim 6, wherein forcing the expander through a section of pipe includes pulling the expander through the section of pipe.

10. The method of splitting a pipe of claim 6, wherein forcing the expander through a section of pipe includes pushing the expander through the section of pipe.

11. A method of replacing a steel pipe, comprising:
    pulling an expander through a section of steel pipe to generate a hoop stress in the steel pipe, the expander including an entry profile smaller than an inner diameter of the steel pipe and an expanded profile that is larger than an inner diameter of the steel pipe;
    forcing a protrusion into an interior surface of the steel pipe to create a stress concentration point, the protrusion disposed on the expander and extending radially outwardly from the expander no farther than the expanded profile;
    generating a split in the steel pipe resulting from the stress concentration point, the split being formed in front of the protrusion and not in direct contact with the protrusion, the protrusion including a diamond shape including:
        a point positioned to contact the steel pipe and configured to remain below an exterior wall of the steel pipe; and
        a widened portion configured to spread the split of the steel pipe and propagate the split along the steel pipe; and
    concurrently pulling in a replacement pipe behind the expander.

12. The method of claim 11, wherein forcing the protrusion includes forcing a substantially diamond shaped protrusion into the interior surface of the steel pipe, wherein the protrusion comes to a point positioned to contact the interior surface of the pipe to create the stress concentration point.

13. The method of claim 11, wherein forcing the protrusion includes forcing a protrusion including a trailing portion that tapers back to an expanded profile portion of the expander.

\* \* \* \* \*